March 29, 1966    P. M. ROSS, JR    3,242,695
SLIP SPLINE LUBRICATION SYSTEM
Filed Dec. 23, 1963
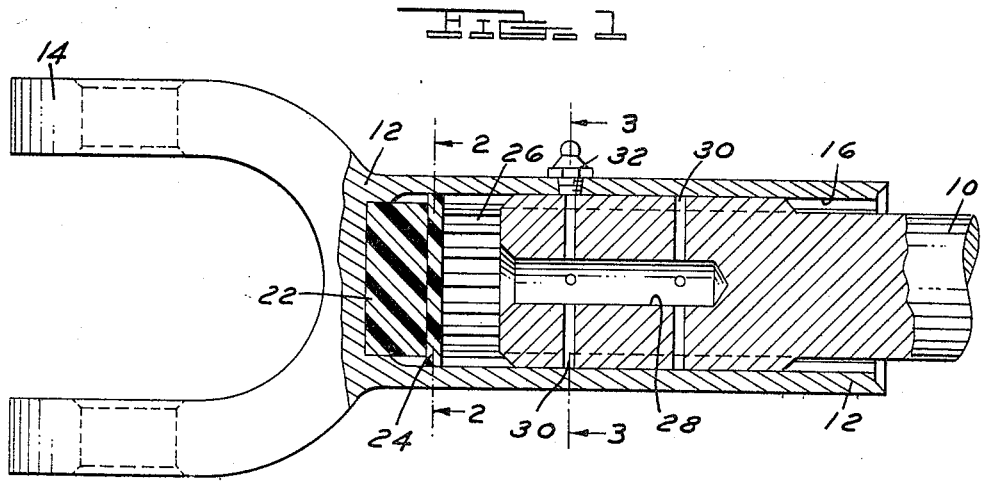
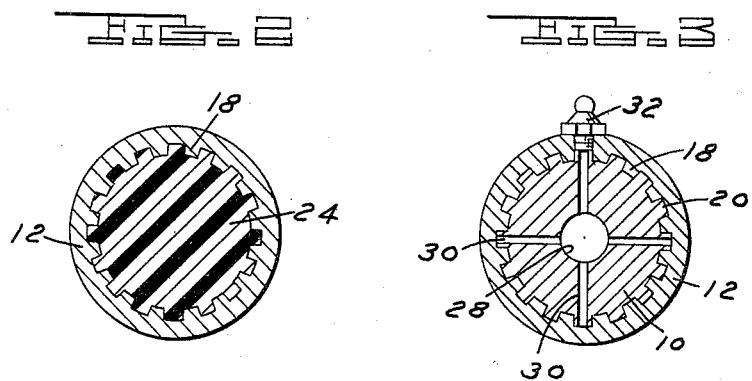
PETER M. ROSS, JR.
INVENTOR.
BY John R. Faulkner
Clifford L. Sadler
ATTORNEYS 3,242,695
SLIP SPLINE LUBRICATION SYSTEM
Peter M. Ross, Jr., Livonia, Mich., assignor to Ford Motor Company, Dearborn, Mich., a corporation of Delaware
Filed Dec. 23, 1963, Ser. No. 332,642
1 Claim. (Cl. 64—23)

The present invention relates generally to means for lubricating the slip spline connection between telescopically engaged shaft members.

It is conventional practice to provide a slip spline connection between two shaft members where it is necessary to accommodate axial movement as well as the transmission of torque. For an example, in an automotive vehicle the drive shaft drivingly connects the transmission which is fixed with respect to the vehicle chassis to the rear axle which moves in jounce and rebound. When the rear axle traverses its vertical path, the interconnecting drive shaft must change in effective length. For that purpose, a slip spline connection is provided.

A slip spline connection usually comprises a first shaft member having a hollow bore with internal longitudinally extending teeth or splines. A second shaft is externally splined and slidably fitted within the bore in a complementary fashion. Considerable clearance is provided between the depth of the bore and the end of the second shaft to permit the axial displacement of the two shaft members.

The engaging splines must be well lubricated to permit uninhibited relative axial movement in spite of the considerable torque being transmitted. With an air space at the depth of the bore, the lubricant tends to collect there and starve the splines. This results in increased friction and galling of the spline teeth.

In view of this state of the art, it is an object of the present invention to provide a lubrication system for a slip spline construction that maintains the spline teeth in a lubricated condition.

This, and other objects of the present invention will be more fully comprehended from the following discussion and the accompanying drawings, in which:

FIGURE 1 is an elevational view partly in section of a slip spline shaft coupling incorporating an embodiment of this invention;

FIGURE 2 is a sectional view taken along section lines 2—2 of FIGURE 1; and

FIGURE 3 is a sectional view taken along section lines 3—3 of FIGURE 1.

Referring now to FIGURE 1, a first shaft 10 is connected to a second shaft 12 by a slip spline coupling that incorporates an embodiment of this invention. The spline coupling provides a driving connection between the shafts 10 and 12 for the transmission of torque. The shaft 12 includes a yoke 14 member for connection to a universal joint. Shafting of this general arrangement may be used in an automotive driveline.

Shaft 12 has an internal bore 16 that extends in an axial direction. The walls of the bore 16 are lined with axially extending teeth or splines 18. In a complementary fashion, the shaft 10 is provided with external axially extending splines 20. The splines 18 and 20 mesh to permit axial displacement of the shaft members 10 and 12.

The bore 16 has greater depth than is necessary to accommodate the axial movement of the shaft end 10. A sponge 22 is secured to the depth of the bore 16 and sealed by a plastic disc 24 that has external teeth to match the splines 18.

The space 26 between the disc 24 and the end of the shaft 10 is filled with lubricant. In order to facilitate the transmission of this lubricant to the splines 18 and 20, the shaft 10 has an axial bore 28 and a series of connecting radial holes 30 that extend outwardly from the bore 28 to the splines 18 and 20. The system is charged with lubricant through a fitting 32.

When the shaft 10 moves inwardly, grease within the space 26 and the bore 28 is forced outwardly through the holes 30 to the splines 18 and 20. A change in volume of the space 26 caused by the inward movement of shaft 10 will be accommodated by the collapsing of the sponge 12 and sliding of the plastic disc 24.

In conventional constructions, air trapped at the depth of the bore becomes entrained in the lubricant and destroys its effectiveness. With the lubrication system of the present invention, there is no air present to mix with the lubricant. In addition, the sponge 22 and disc 24 are compressed so that the lubricant is maintained under a slight pressure. This enhances the distribution of the lubricant.

Alterations and modifications of the invention may occur to those skilled in the art which will come within the scope and spirit of the following claim. For an example, the sponge 22 may be of a closed cell construction and in certain applications, this would permit the elimination of the plastic disc 24. In addition, the arangement of the grease distributing passages 28 and 30 may be modified to meet problems presented by specific applications.

I claim:

A lubrication system for a shaft coupling comprising a first shaft having an axial bore, said bore having internal splines, a second shaft having external splines, said second shaft being fitted in said bore with said internal and external splines in sliding engagement, a space defined between the end of said second shaft and the depth of said bore, a sponge member disposed in said space, a splined disc interposed between said sponge and the end of said second shaft and slideably engaging said internal splines of said bore, a lubricant contained within said space, an axially extending lubricant passageway situated within said second shaft and having one end in communication with said space and its other end terminating as a blind hole, a plurality of axially and circumferentially spaced apart radial passageways in said second shaft providing communication between said axially extending passageway and portions of said splines, whereby movement of said second shaft inwardly in said bore will cause compression of said sponge member and an increase in the pressure of the lubricant in said space that will tend to force lubricant from said space through said axially extending passageway and through said radial passageways to the surface of said splines.

References Cited by the Examiner

UNITED STATES PATENTS 1,696,774   12/1928   Martin _____ 184—45
1,973,702   9/1934    Cooke _____ 64—23

FOREIGN PATENTS 804,075   7/1936   France.
314,880   9/1929   Great Britain.

BROUGHTON G. DURHAM, Primary Examiner.
D. H. THIEL, Assistant Examiner.